United States Patent
Le Poder et al.

(10) Patent No.: US 6,485,652 B1
(45) Date of Patent: Nov. 26, 2002

(54) PROCESS FOR PHYSICO-CHEMICAL TREATMENT OF WATER AND INSTALLATION FOR EMBODIMENT OF THIS PROCESS

(76) Inventors: Nicolas M. Le Poder, 52, rue des Basses Roches, Conflans-Ste-Honorine, 78700 (FR); Didier M. Haegel, 13, avenue Villiers sur Marne, Villiers sur Marre, 94350 (FR)

(*) Notice: Subject to any disclaimer, the term of this patent is extended or adjusted under 35 U.S.C. 154(b) by 0 days.

(21) Appl. No.: 09/529,398
(22) PCT Filed: Oct. 6, 1998
(86) PCT No.: PCT/FR98/02135
§ 371 (c)(1), (2), (4) Date: Jun. 14, 2000
(87) PCT Pub. No.: WO99/19261
PCT Pub. Date: Apr. 22, 1999

(30) Foreign Application Priority Data

Oct. 14, 1997 (FR) ............................................. 97 13077

(51) Int. Cl.⁷ ............................................. B01D 21/02
(52) U.S. Cl. ........................ 210/713; 210/802; 210/804; 210/200; 210/253; 210/522; 210/532.1
(58) Field of Search ................................. 210/713, 723, 210/199, 200, 207, 208, 209, 532.1, 521, 522, 802, 804, 253, 254

(56) References Cited

U.S. PATENT DOCUMENTS

| 3,797,668 A | 3/1974 | Pieldenrood et al. ........ 210/522 |
| 3,959,133 A | * 5/1976 | Fulton ........................ 210/804 |
| 4,142,970 A | 3/1979 | von Hagel et al. ......... 210/522 |
| 4,401,565 A | * 8/1983 | Schimel ...................... 210/522 |
| 5,730,864 A | * 3/1998 | Delsalle et al. .......... 210/195.1 |
| 5,840,195 A | * 11/1998 | Delsalle et al. ............. 210/713 |
| 6,010,631 A | * 1/2000 | Delsalle et al. ............. 210/713 |

FOREIGN PATENT DOCUMENTS

DE 3700725 A1 7/1988 ............. C02F/9/00

* cited by examiner

Primary Examiner—Christopher Upton
(74) Attorney, Agent, or Firm—Coats & Bennett, P.L.L.C.

(57) ABSTRACT

The invention concerns a method for the physico-chemical treatment of water characterized in that it comprises at least a step consisting in causing the water to be treated in at least one settler providing non-thickened sludge and in at least one settler-thickener treating the sludge from the two settlers and part of the water to be treated. The invention also concerns a plant for implementing said method comprising means for supplying the water to be treated (6), at least a settler providing non-thickened sludge (2), at least a settler-thickener (5, 5a), means for conveying (7) at least part of the non-thickened sludge coming from the settler providing non-thickened sludge (2) to the settler-thickener (5, 5a), means for evacuating (9, 9a) treated water coming from said settler providing non-thickened sludge (2) and from said settler-thickener (5, 5a) and means for evacuating (8) the thickened sludge coming from said settler-thickener.

29 Claims, 5 Drawing Sheets

PROCESS FOR PHYSICO-CHEMICAL TREATMENT OF WATER AND INSTALLATION FOR EMBODIMENT OF THIS PROCESS

BACKGROUND OF THE INVENTION

This invention relates to the field of water treatment for purification or for making it drinkable, and particularly but not exclusively urban or industrial waste water and rain water.

Standard practice includes various physicochemical water treatment techniques making use of different types of settling tanks that can achieve different hydraulic treatment velocities that depend particularly on their architecture and their size.

With simple settling tanks it is hardly possible to achieve velocities higher than 2.5 m/h, but these velocities can be as high as 10 to 15 m/h when the internal structure of the settling tanks used includes lamellar elements. In particular, lamellar settling tanks of this type are marketed by the Applicant under the trade name MULTIFLO (registered trademark). Furthermore, when the settling step itself is preceded by a coagulation-flocculation step, velocities of the order of 30 m/h, or even 80 m/h, can be achieved if a sludge recirculation step is included. An even more advanced technique developed by the Applicant and marketed under the brand ACTIFLO (registered trademark) consists of using settling tanks with flocs ballasted by appropriate ballasting material, and particularly micro-sand. A technique of this type is described in detail in patents FR 2 627 704 and FR 2 719 734 issued to the Applicant. With this type of ballasting of flocs formed in settling tanks, treatment velocities of 50 m/h and up to 200 m/h can be achieved.

Settling tanks of the type described above produce unthickened sludge. The sludge concentration at the outlet from ballasted floc settling tanks using a granular material usually varies between 0.5 g/l and 20 g/l of dry matter (DM). Therefore, this sludge has to be thickened using thickeners to achieve a concentration of between 20 and 250 g/l of DM (corresponding to a dryness ratio of 2 to 25%), and preferably between 20 and 90 g/l of DM (corresponding to a dryness ratio of 3 to 9%).

Within the framework of the ACTIFLO technique described above, a thickener is designed to recover sludge from the settling tank, and overflow water from thickeners is returned to the top of the settling tank. This return of water from the thickener overflow to the beginning of the line increases the water influent entering the installation to be treated.

In other settling tanks according to the standard practice, the sludge thickening function is built into the settling tanks themselves. These settling tanks are then conventionally called "thickener settling tanks". In this respect, note the technique also developed by the applicant and marketed under the name MULTIFLO E or EF, or many other techniques described in patent document FR 2 156 277. Similar techniques also use sludge recirculation (U.S. Pat. No. 4, 388, 195, FR 2 553 082). With these thickener settling tanks, hydraulic treatment velocities of the order of 30 to 50 m/h, or even 80 m/h in some cases, can be obtained to produce a sludge with a dryness that can vary from 2 to 25%, with an average of 3 to 8% (corresponding to 30 to 80 g/l of dry matter). However, they cannot obtain velocities as high as the velocities possible with ballasted floc settling tanks.

Concerning the technique used for thickeners, static thickeners based on a load on the base mat corresponding to the maximum allowable mass flow of dry matter per unit area. Conventionally, this base mat load is between 20 and 100 kg/DM/m$^2$/d. A lamellar thickener preceded by an unthickened sludge flocculation step can increase base mat loads to between 500 and 3000 kg DM/m$^2$/d, and sometimes more.

SUMMARY OF THE INVENTION

The main purpose of this invention is to describe a process capable of benefiting from the advantages of ballasted floc settling tanks with a granular material that can operate at very high hydraulic velocities (up to 200 m/h as mentioned above) and the advantages of lamellar thickener settling tanks that give very good thickening of the sludge, but the maximum hydraulic velocities are not as high as the velocities possible with ballasted floc settling tanks.

Another purpose of this invention is to describe such a process making use of settling tanks with base mat areas smaller than the areas that would conventionally be used according to standard practice for optimized hydraulic treatment velocities and sludge drynesses, and therefore reduce the size of the corresponding installations for embodiment of this process.

Another objective of this invention is to divulge such a process that can overcome the need to return water overflowing from thickeners to the beginning of the installation.

Another objective of this invention is to propose a process that can enable efficient treatment of water when the flow or mass content of the water to be treated increases, even suddenly, for example during rainstorms.

These various objectives are achieved according to the invention which relates to a process for the physicochemical treatment of water, characterized in that it comprises at least one step that consists of passing the water to be treated in at least one settling tank of the type that produces unthickened sludge, and in at least one thickener settling tank, the said thickener settling tank treating the sludge from the two settling tanks and part of the water to be treated.

Therefore the main innovation of this process according to this invention is the characteristic according to which the thickener settling tank is not used only to treat sludge from a settling tank producing thickened sludge, but it is also used to treat some of the water itself (influent). As described in detail later, it is thus possible to reduce the size of the installations since the settling tank function of the thickener settling tank can increase the available settling area to treat the influent.

According to one particularly interesting variant of the invention, the said settling tank of the type producing unthickened sludge is a ballasted floc settling tank ballasted by at least one granular material, preferably micro-sand, and the said thickener settling tank is a lamellar thickener settling tank. The granular material will preferably consist of micro-sand, although almost any granular material known to those skilled in the art could be envisaged.

The invention thus combines the advantages of settling tanks with flocs ballasted by a granular material capable of functioning at very high hydraulic velocities (up to 200 m/h as mentioned above), and the advantages of lamellar thickener settling tanks that provide a very good sludge thickening function. Thus, in a preferred variant of the invention, ACTIFLO ballasted floc settling tanks can be used with MULTIFLO E or EF thickener settling tanks marketed by the Applicant and described above. Within the framework of this type of preferred embodiment, it will be noted that the sludge originating from such a settling tank with flocs ballasted by a granular material thickens very well and does not cause any disturbance in the thickener settling tank. All that is necessary to achieve this is to reduce the water flow treated on this structure, and increase the water flow treated on the settling tank with flocs ballasted by the granular material.

The size of a thickener settling tank depends on two parameters, namely the hydraulic velocity for settling and the mass load on the base mat for thickening. The hydraulic velocity is usually the controlling factor. With the process according to the invention, returning unthickened sludge from the lamellar settling tank with flocs ballasted by the granular material, the concentration of sludge in the thickener settling tank increases such that the maximum allowable hydraulic velocity can be increased, and thus the maximum hydraulic velocity corresponding to the velocity of the mass load on the base mat can be used. Therefore, with the process according to the invention, the thickener settling tank is sized as a function of the maximum allowable load on the base mat and the ballasted floc settling tank is sized to handle the additional amount that cannot be accepted hydraulically by the thickener settling tank.

According to another embodiment of the invention, the lamellar thickener settling tank used may also include sludge recirculation. In this case, the process according to the invention advantageously comprises a step in which the said unthickened sludge from the settling tank of the type producing unthickened sludge is mixed with sludge recirculated from the lamellar thickener settling tank with sludge recirculation.

According to one variant of the invention, the process consists of passing water to be treated through the said settling tank producing unthickened sludge and then in the said thickener settling tank, the said settling tanks then being supplied in series.

According to another variant, the said settling tank producing unthickened sludge and the said thickener settling tank can be configured in parallel.

This type of variants to the process will be used to adapt it to the conditions in which it is used and particularly to variations in the material and water flows to be treated.

According to another interesting aspect of the invention, the process comprises an additional step consisting of adding at least one reagent in order to improve settling and thickening of the sludge in the said thickener settling tank. This reagent may be added continuously to the water, in other words the said reagent is added directly into the influent to be treated or in a coagulation-flocculation step included on the inlet side of the said thickener settling tank, or included in it. Advantageously, it may be envisaged as part of an installation using the ECOFLOC prolonged coagulation process developed by the applicant and described in French patent FR 2 631 021.

The main advantages of this invention that consists of the combined use of a settling tank of the type producing unthickened sludge (preferably a settling tank with flocs ballasted by at least one granular material) and a thickener settling tank (preferably lamellar with or without sludge recirculation) are as follows.

The process according to the invention is more competitive than processes according to standard practice mentioned in the preamble (settling tank + thickener or settling tank with integrated thickener) particularly due to the fact that it reduces the dimensions of installations necessary for its embodiment.

This invention eliminates the need to return overflows from thickeners to the beginning of the installation, which are necessary when settling tanks coupled with a sludge thickener are used alone.

Furthermore, if unthickened but pre-flocculated sludge obtained from the ballasted floc settling tank is injected into the thickener settling tank, it is possible to:

obtain a higher concentration of SS (suspended solids) at the inlet to the thickener settling tank, that enables optimized hydraulic treatment velocities within this thickener settling tank;

obtain sludge with a higher dryness ratio;

if applicable, reduce the recirculated sludge flow rate when it is decided to use a thickener settling tank with sludge recirculation;

possibly reduce the content of reagents used in the thickener settling tank;

increase the load on the thickener settling tank base mat (since the sludge is mixed, it thickens more quickly so that the load on the base mat of the thickener part of the thickener settling tank can be increased and therefore improved) while keeping the water quality conform with the required quality;

easily accommodate variations in pollutant flows to be treated;

adapt the process to treat dry weather or wet weather water and material flows.

The invention also relates to any installation for use of the process as described above, characterized in that it comprises means of conveying the water to be treated to the inlet, at least one settling tank of the type producing unthickened sludge, at least one thickener settling tank, means of transporting at least part of the unthickened sludge from the settling tank of the type producing unthickened sludge to the thickener settling tank, means of conveying treated water away from the said settling tank of the type producing unthickened sludge and from the said thickener settling tank and means of conveying thickened sludge away from the said thickener settling tank.

If required, this type of installation could be preceded by conventional means for preliminary treatment of the water to be treated (for example screening, sand removal and degreasing, or simply screening). Sludge from thickened sludge removal means can be conveyed in a known manner to means of treatment of this sludge. Finally, a post-treatment can then be applied to treated water outlet from the installation.

Preferably, said means of conveyance of water to be treated of the installation according to the invention are such that the said settling tank of the type producing unthickened sludge and the said thickener settling tank can be configured either in series or in parallel. This type of installation could thus be easily configured to adapt to variations in content and/or flow of the influent. Advantage could also be taken of this characteristic when the installation is started up.

Preferably, the said settling tank of the type producing unthickened sludge is a lamellar settling tank with flocs ballasted by at least one granular material (for example such as an ACTIFLO settling tank marketed by the Applicant).

Also preferably, the said thickener settling tank is a lamellar thickener settling tank or a lamellar thickener settling tank with sludge recirculation.

Advantageously, the installation also comprises means of adding at least one coagulating or flocculating reagent in the said thickener settling tank.

The invention also relates to processes for use of this installation.

In particular, the invention also relates to a process that consists of supplying the said settling tank of the type producing unthickened sludge and the said thickener settling tank in series when starting up of the installation, and supplying the said settling tanks in parallel once the installation has been started up.

The invention also relates to a process that consists of supplying the said settling tank of the type producing unthickened sludge and the said thickener settling tank in series when a normal flow and/or inlet of water to be treated is input into the said installation, and supplying the said settling tanks in parallel during peak water or material flows.

BRIEF DESCRIPTION OF THE DRAWINGS

The invention and its many advantages, will be more easily understood after reading the following description of several non-restrictive embodiments of the invention with reference to the drawings, in which.

DESCRIPTION OF THE PREFERRED EMBODIMENT

Figure 1:
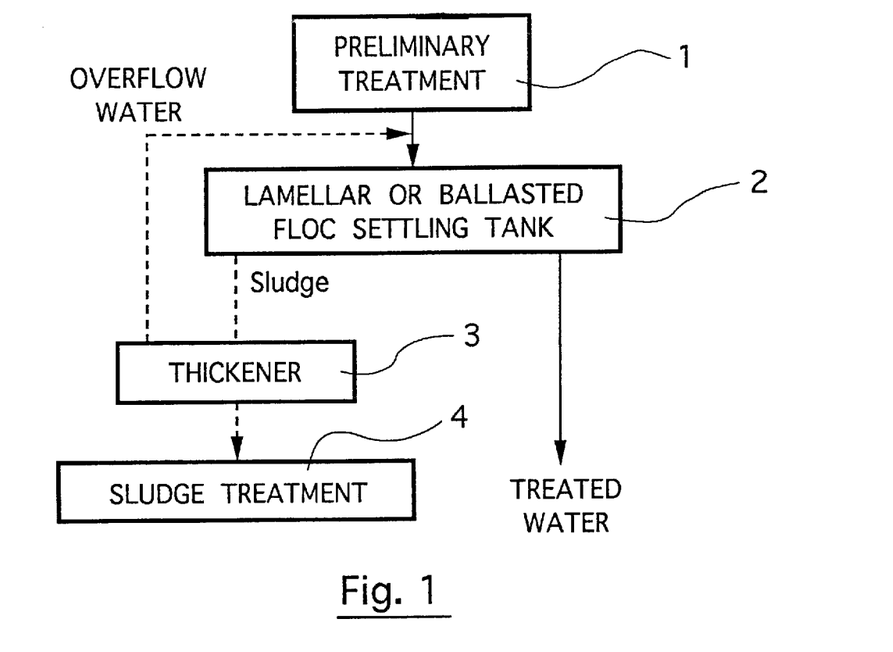
FIGS. 1 and 2 diagrammatically show different installations using physicochemical treatment processes according to standard practice.

FIG. 1 shows a first installation for physicochemical treatment of water according to a first known technique. This installation includes a preliminary treatment unit 1 (possibly simply a screen), a settling tank of the type producing unthickened sludge 2 (for example a MULTIFLO lamellar settling tank or an ACTIFLO ballasted floc settling tank), from which unthickened sludge and treated water are extracted. The unthickened sludge is conveyed towards a thickener 3 to increase its dryness ratio. Thickened sludge is then transferred to a sludge treatment unit 4. The overflow water from the thickener 3 is returned to the inlet of the settling tank 2. The type of settling tank described in this known technique can produce high treatment velocities, but requires the use of an associated thickener and therefore the use of large installations.

Figure 2:
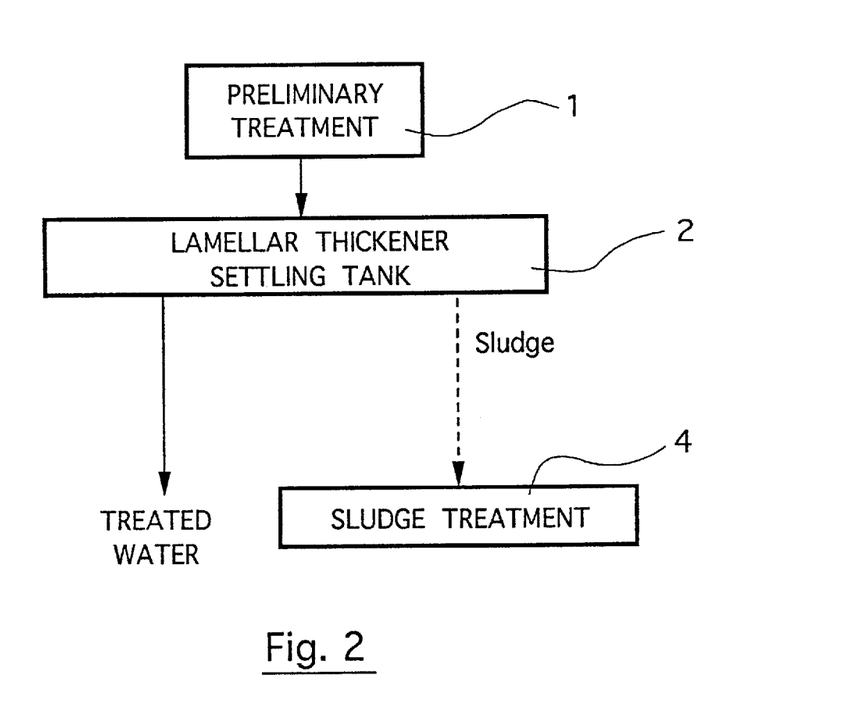

FIG. 2 shows a second installation for physicochemical treatment of water according to a second known technique. This installation includes a preliminary treatment unit 1 (possibly simply a screen), and a lamellar thickener settling tank 5 (for example a MULTIFLO E or EF lamellar thickener settling tank) at the outlet from which thickened sludge and treated water are obtained directly, the thickened sludge then being conveyed to a sludge treatment unit 4. (Note that the lamellar thickener settling tank can also be composed of a lamellar settling tank with sludge recirculation).

Thickener settling tanks according to this second known technique can produce sludge with a high dryness ratio, but are incapable of achieving treatment velocities possible with first known technique.

Figure 3:
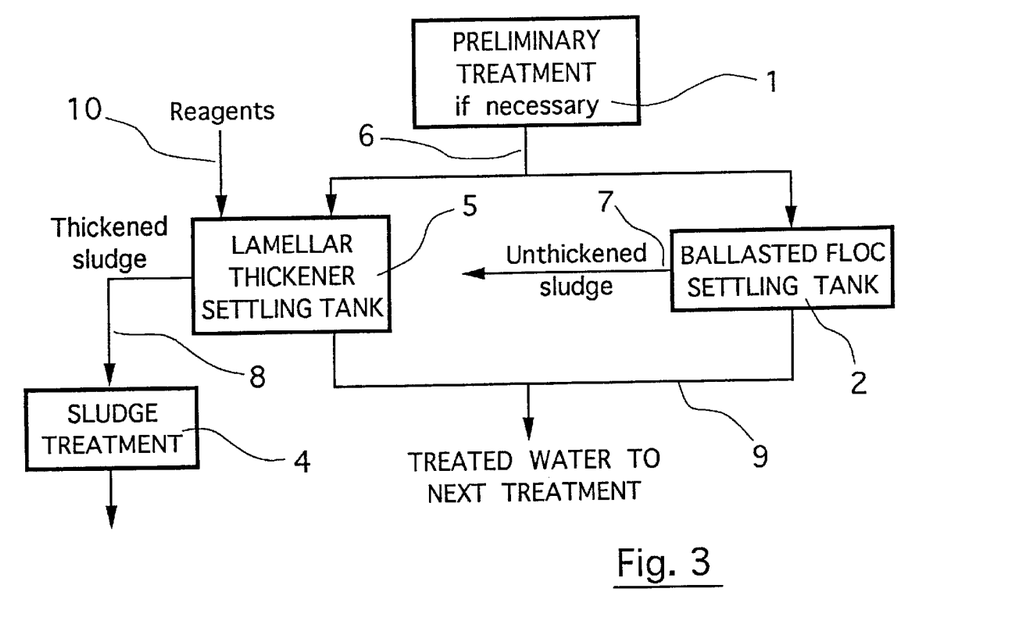
FIG. 3 shows a first embodiment of an installation making use of the process according to the invention.

FIG. 3 shows an installation making use of the process according to the invention.

This installation comprises preliminary treatment means 1, a settling tank of the type producing unthickened sludge composed of a ballasted floc settling tank 2, a lamellar thickener settling tank 5, conveyance means 6 bringing the water to be treated into the ballasted floc settling tank 2 and into the lamellar thickener settling tank 5, means 7 of conveying unthickened sludge from the ballasted floc settling tank 2 to the thickener settling tank 5, means of evacuation of treated water 9 from the two settling tanks 2, 5 and means 8 of evacuating the thickened sludge from the thickener settling tank 5 to a sludge treatment unit 4. The installation also includes means 10 of adding at least one reagent into the thickener settling tank.

The following is a comparative example of the sizes of an installation based on known techniques of the type shown in FIG. 2, and an installation according to the invention of the type shown in FIG. 3.

This comparative example is based on the following basic data:

Maximum daily mass flow to be treated in the installation: 120000 kg/SS/d

Maximum flow of water to be treated: 10000 m$^3$/h Maximum allowable base mat load in the thickener: 2000 kg/m$^2$/d.

For an installation according to prior art of the type shown in FIG. 2 with a maximum treatment velocity (on the base mat) of 40 m/h, the required area on the base mat is the largest of the areas calculated below:

$$10\ 000\ m^3/h/40\ m/h = 250\ m^2$$

For an installation according to the invention of the type shown in FIG. 3 using a ballasted floc settling tank allowing a maximum velocity on the base mat of 80 m/h, the required area is equal to the sum of the area of the thickener settling tank base mat and the area of the ballasted floc settling tank base mat.

The area of the base mat of the thickener settling tank is sized as a function of the mass flow, namely:

$$120000\ kg/d/SS/2000\ kg/m^2/d = 60\ m^2$$

Given the maximum allowable velocity on the base mat (40 m/h) of the thickener settling tank, the maximum allowable flow on the structure can be deduced as follows:

$$60\ m^2 * 40\ m/h = 2400\ m^3/h$$

The additional flow to be treated on the ballasted floc settling tank is calculated as follows, and will be used to calculate the required area of its base mat: 10 000 m$^3$/h−2 400 m$^3$/h+(hourly flow of unthickened sludge returning into the thickener settling tank (about 5%))=8 000 m$^3$/h.

Knowing the maximum velocity at the base mat of the ballasted floc settling tank (80 m/h), the required area at the base mat is deduced as follows:

$$8000\ m^3/h/80\ m/h = 100\ m^2$$

Therefore within the framework of the invention, the total area of the base mat is 60 m$^2$+100 m$^2$=160 m$^2$, compared with 250 m$^2$ for the installation according to known techniques, giving a saving of 90 m$^2$ (36%).

Figure 4:
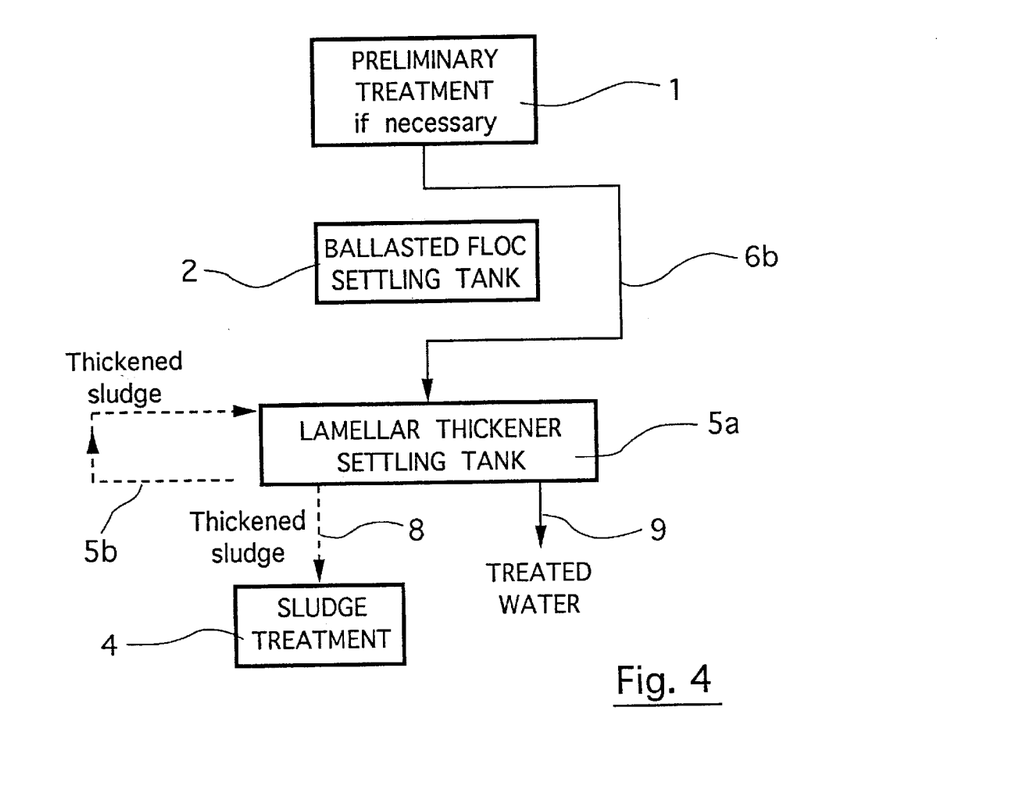
FIGS. 4 to 8 show several operating configurations of a second embodiment of an installation using the process according to the invention.
Figure 5:
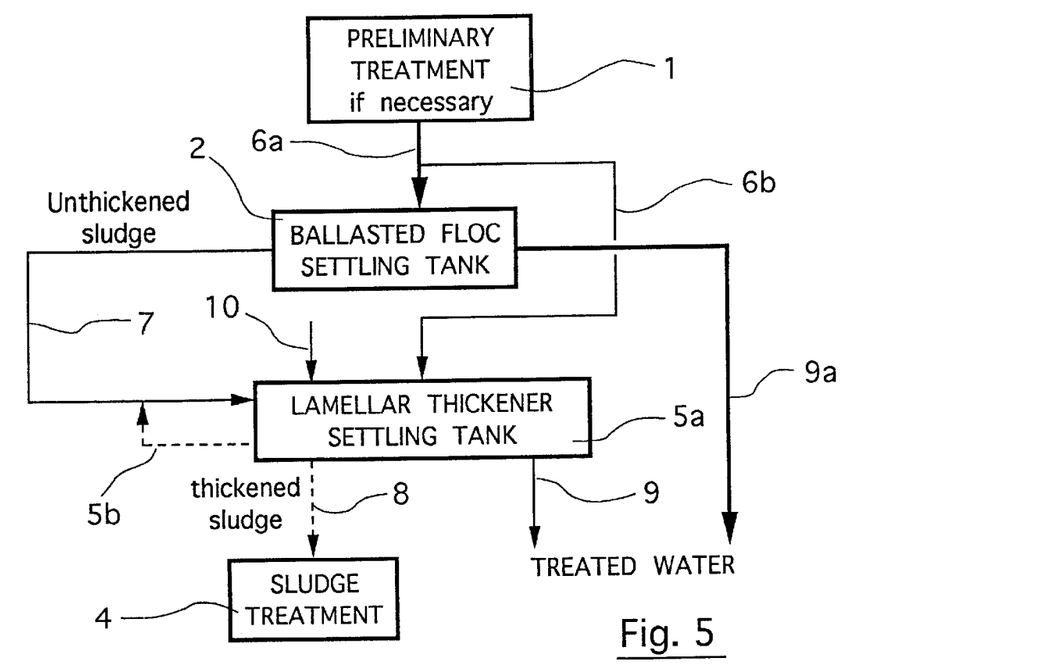

A second embodiment of an installation according to the invention is shown with reference to FIGS. 4 and 5. This installation comprises preliminary treatment means 1, a ballasted floc settling tank 2, a lamellar thickener settling tank 5a provided with means of recirculating thickened sludge 5b, means 6a, 6b of conveying water to be treated into the ballasted floc settling tank 2 and into the lamellar thickener settling tank 5a, means 7 of conveying unthickened sludge from the ballasted floc settling tank 2 into the thickener settling tank 5a, means of evacuation of treated water 9, 9a from the two settling tanks 2, 5a, and means of evacuation 8 of thickened sludge from the thickener settling tank 5b to a sludge treatment unit 4. The installation also comprises means 10 of adding at least one reagent into the thickener settling tank 5b.

This installation can be used in dry weather with rain water flow peaks 3 to 4 times greater than flow peaks in dry weather, by passing the entire incoming flow into the thickener settling tank (see configuration in FIG. 4).

In wet weather (see configuration in FIG. 5), the thickener settling tank will be used to thicken unthickened sludge from the ballasted floc settling tank 2. The thickener settling tank will be designed to accept a small proportion of the flow to be treated and thus contributes to reducing the dimensions of the ballasted floc settling tank. This type of operation also has the advantage that it can reduce or even eliminate the addition of reagents necessary for operation in dry weather, when treatment requirements are low.

As mentioned above, the settling tank of the type producing unthickened sludge (corresponding to a settling tank 2 with flocs ballasted by a granular material, within the framework of this embodiment) and the thickener settling tank (corresponding to a lamellar thickener settling tank with sludge recirculation 5a within the framework of this embodiment) can be supplied in series or in parallel. The inlet conveyance means 6, 6a and the treated water outlet conveyance means 9, 9a can be varied depending on the configuration.

Figure 6:
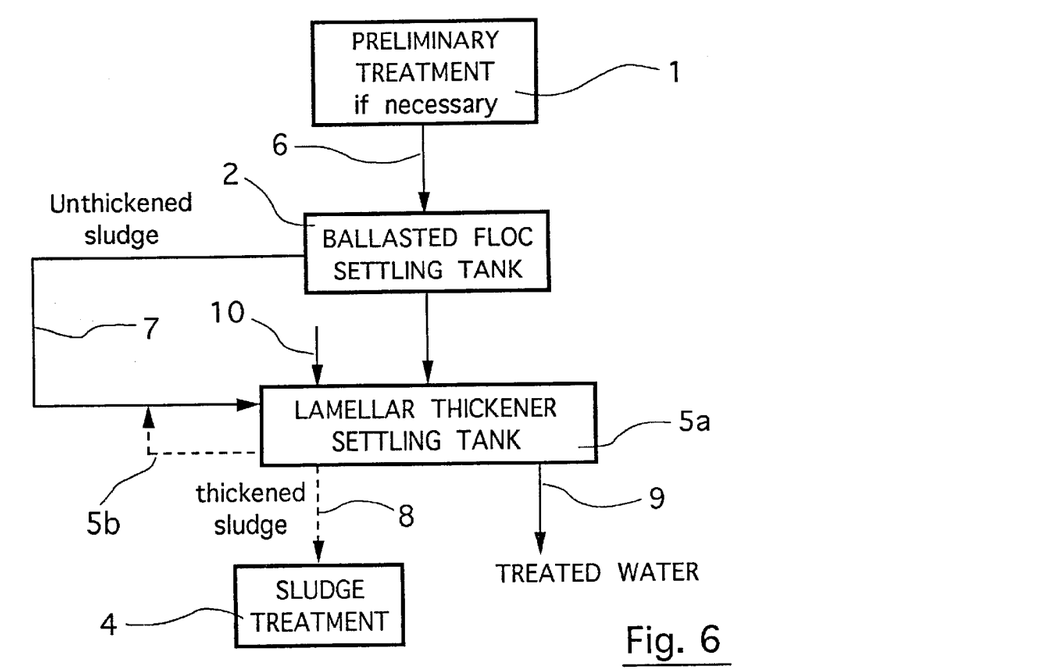

In configuration shown in FIG. 6, these two settling tanks are supplied in series. Very good quality water can be obtained at all times with this configuration. With this configuration, unsettled sludge can be returned to the thickened sludge recirculation 5b used to create and maintain the sludge bed in the thickener settling tank 5a. This can give a better consistency of the sludge bed, so that it is possible to work at greater hydraulic velocities while maintaining a high quality water at the outlet.

Figure 7:
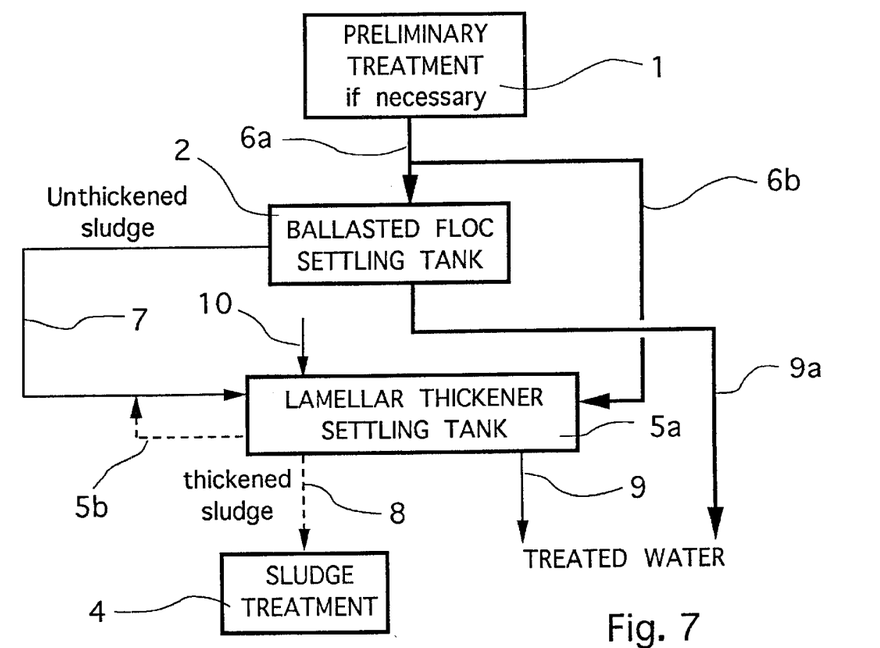

If the flow or the material contained in the water to be treated increases, the two settling tanks 2, 5a may be supplied in parallel using the configuration shown in FIG. 7. When the hydraulic or mass flow peak has finished, the two settling tanks 2, 5a may once again be supplied in parallel.

The configuration in series may also be used when the installation is started in order to facilitate creation of the sludge bed in the thickener settling tank 5a. Any expert in the subject knows that some time is necessary to create this sludge bed, however the ballasted floc settling tank 2 starts up instantaneously even if the structure is empty. The unthickened ballasted sludge that is initially sent into the thickened sludge recirculation loop 5b accelerates creation of the sludge bed. Once the sludge bed has been formed, the two settling tanks may be supplied in parallel.

Figure 8:
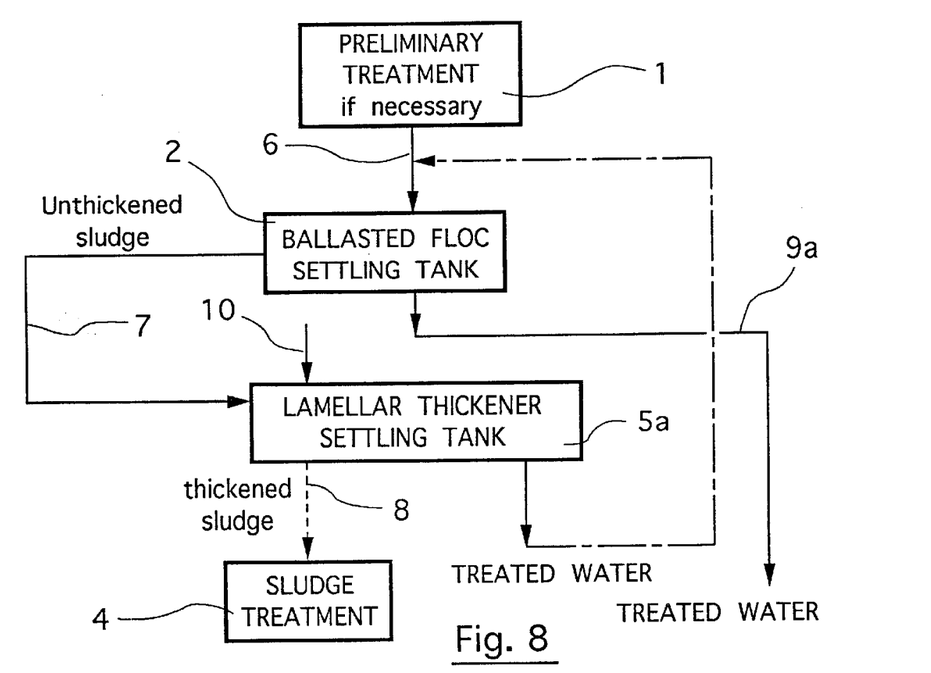

Another startup possibility shown in FIG. 8 consists of starting the ballasted floc settling tank 2 and evacuating the treated water from this settling tank. During this time, unthickened sludge is transferred to the lamellar thickener settling tank 5a that is used only for its thickening function. As long as the water outlet from the thickener settling tank 5a is not conform, the water is returned to the inlet to the station to be treated in the ballasted floc settling tank 2. As soon as the thickener settling tank 5a is working correctly, as a settling tank and as a thickener, the treated water is released directly into the natural environment or the next treatment, and operation in parallel can be started as shown in FIG. 7.

Figure 9:
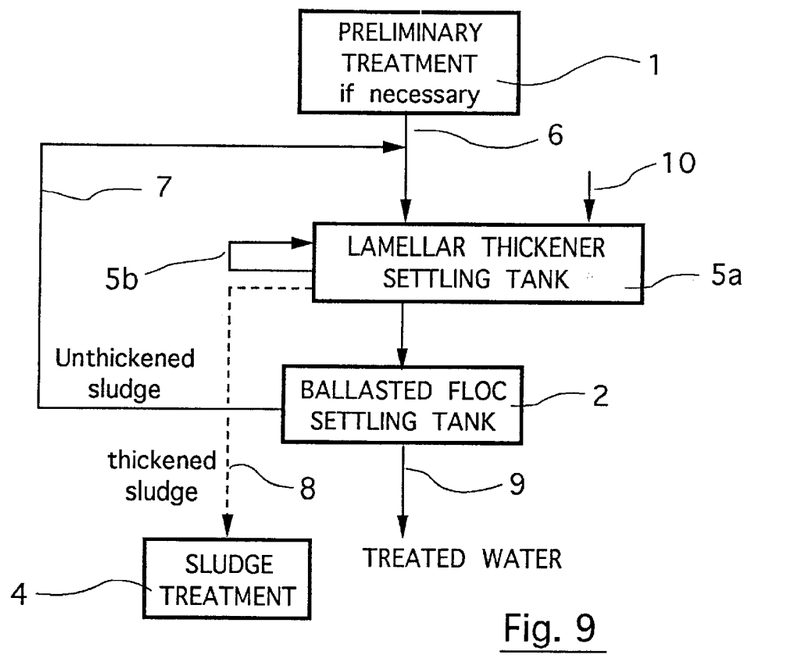
FIGS. 9 and 10 show several operating configurations of a third embodiment of an installation using the process according to the invention.
Figure 10:
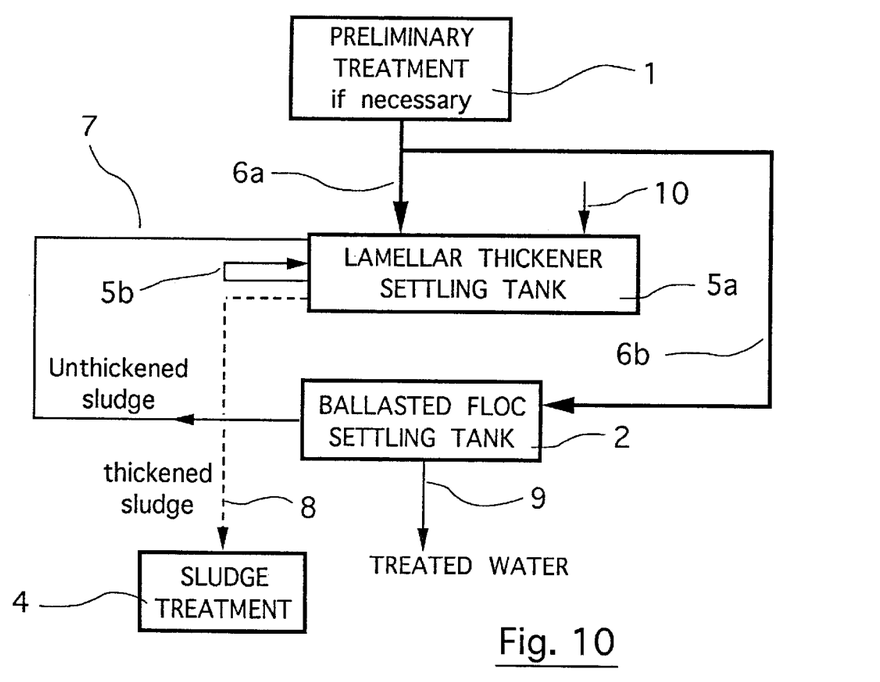

The installation shown in FIGS. 9 and 10 is not different from the installation shown in FIGS. 4 to 8, except that the lamellar thickener settling tank 5a is located on the inlet side of the ballasted floc settling tank 2.

FIG. 9 shows how the lamellar thickener settling tank 5a is put into series with the lamellar ballasted floc settling tank 2 following it, if a constant quality is to be obtained regardless of the water flow to be treated. In this case, the thickener settling tank 5a will operate at hydraulic velocities greater than the velocities normally required (in practice greater than 50 m/h), the water at the outlet from the thickener settling tank 5a will be degraded without causing any disturbance in the ballasted floc settling tank 2. This settling tank is used for a refining treatment to eliminate residual suspended solids (SS) and parasites, particularly such as helminth eggs. During peak water or material flows, the two settling tanks are supplied in parallel using the configuration shown in FIG. 10.

The embodiments of the invention described are not intended to reduce the scope of the invention. Many modifications can be made to them without going outside the framework of this invention.

What is claimed is:

1. A physiochemical treatment process for treating water, comprising:
   directing water to be treated through a first settling tank that produces a relatively unthick sludge;
   directing the water to be treated through a second settling tank that produces a relatively thick sludge; and
   directing the relatively unthick sludge from the first settling tank through the second settling tank.

2. The method of claim 1 including splitting the water to be treated into two streams and directing one stream through the first settling tank that produces the relatively unthick sludge and directing a second stream of the water to be treated through the second settling tank that produces the relatively thick sludge.

3. The method of claim 2 wherein the first and second settling tanks are disposed in parallel relationship.

4. The method of claim 2 wherein the relatively thick sludge produced by the second settling tank is made up in part at least of sludge resulting from the second stream of water directed through the second settling tank and the relative unthick sludge transferred from the first settling tank to the second settling tank.

5. The method of claim 4 including directing the relative thick sludge produced by the second settling tank to a sludge treatment area.

6. The method of claim 4 wherein each of the first and second settling tanks produce a treated effluent water stream.

7. The method of claim 1 including adding a reagent to the second settling tank.

8. The method of claim 7 wherein the reagent added to the second settling tank includes a coagulant—flocculant.

9. The method of claim 1 including subjecting the wastewater directed to the first settling tank to ballasted flocculation.

10. The method of claim 9 wherein the second settling tank comprises a lamellar thickener settling tank.

11. The method of claim 1 wherein the first settling tank generally produces sludge having 20 g/l or less of dry matter, and the second settling tank generally produces sludge having a dry matter of greater than 20 g/l.

12. The method of claim 1 wherein the dry matter of the sludge produced by the first settling tank ranges generally between approximately 0.5 g/l and 20 g/l, and the sludge produced by the second settling tank produces sludge having dry matter of approximately 20 g/l to 250 g/l.

13. The method of claim 1 wherein the first and second settling tanks are arranged in series.

14. The method of claim 13 wherein substantially all of the water treated by the two settling tanks passes through at least one of the settling tanks.

15. The method of claim 1 including recycling at least a portion of the relatively thick sludge back through the second settling tank.

16. The method of claim 1 wherein the first and second settling tanks are disposed in series such that the water being treated is directed through one settling tank before being directed through the other.

17. The method of claim 16 including directing the water to be treated through the first settling tank and then directing the resulting relatively unthick sludge and accompanying water to be treated from the first settling tank to the second settling tank.

18. The method of claim 16 including directing the water through the second settling tank prior to the water being directed through the first settling tank.

19. The method of claim 1 wherein in relatively dry weather the method includes bypassing the first settling tank and directing the water to be treated to the second settling tank.

20. The method of claim 1 wherein each of the first and second settling tanks separate sludge from water so as to produce a treated water effluent.

21. An installation for the physiochemical treatment of water, comprising:

a first settling tank for receiving water to be treated and for producing a relatively unthick sludge;

a second settling tank for receiving water to be treated and for producing a relatively thick sludge;

at least one line for directing water to be treated to both said first and second settling tanks; and a second line interconnected between the first settling tank and the second settling tank for transferring at least a portion of the relatively unthick sludge from the first settling tank to the second settling tank.

22. The installation of claim 21 including a recycle line associated with the second settling tank for recycling the relatively thick sludge through the second settling tank.

23. The installation of claim 21 wherein the first and second settling tanks are disposed in parallel relationship and wherein at least one line for transferring water to be treated to both said first and second settling tanks includes a pair of lines with each line being directed to one of the settling tanks.

24. The installation of claim 21 wherein the first settling tank comprises a ballasted floc settling tank.

25. The installation of claim 24 including a sludge treatment area and a third line interconnected between the second settling tank and the sludge treatment area for transferring relatively thick sludge from the second settling tank to the sludge treatment area.

26. The installation of claim 21 wherein the second settling tank comprises a lamellar thickener settling tank.

27. The installation of claim 21 wherein the first and second settling tanks are disposed in series and wherein at least one line for directing water to be treated to the first and second settling tanks includes one line directed to one of the settling tanks and another line directed from the one settling tank to the other settling tank.

28. The installation of claim 21 wherein the first and second settling tanks are disposed in series and wherein the first settling tank is disposed on the inlet side of the second settling tank.

29. The installation of claim 21 wherein the first settling tank is adapted to produce sludge having a dry matter concentration of approximately 20 g/l or less, and wherein the second settling tank is adapted to produce sludge having a dry matter concentration of approximately 20 g/l or greater.

* * * * *